May 21, 1968 M. MAKANSI 3,384,696

PROCESS FOR PROVIDING A PERFORATED ULTRAMICROCELLULAR SHEET

Filed Jan. 27, 1965

INVENTOR

Munzer Makansi

BY Walter N. Kirn Jr.

AGENT

United States Patent Office 3,384,696
Patented May 21, 1968

3,384,696
PROCESS FOR PROVIDING A PERFORATED ULTRAMICROCELLULAR SHEET
Munzer Makansi, Wilmington, Del., assignor to E. I. du Pont de Nemours and Company, Wilmington, Del., a corporation of Delaware
Filed Jan. 27, 1965, Ser. No. 428,450
9 Claims. (Cl. 264—321)

ABSTRACT OF THE DISCLOSURE

A process to obtain uniform, smooth-walled perforations in ultramicrocellular sheets by the insertion of heated protrusion elements at a temperature at least 100° C. above the crystalline melting point of the sheet and for a period of at least from 0.001 to about 1 second.

---

Figure 1:
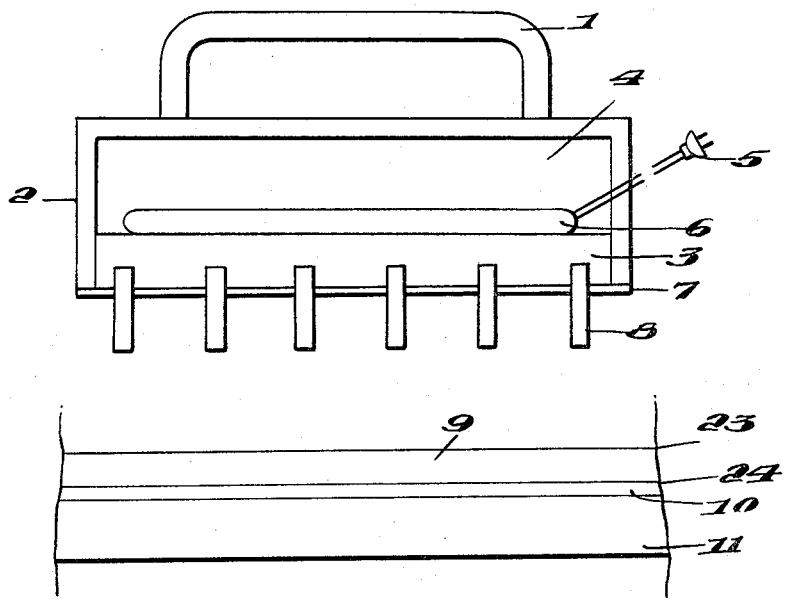

This invention relates to a process for the perforation of foam sheet structures. More particularly, it relates to the perforation of sheet structures comprising crystalline, oriented, polymeric, thermoplastic, ultramicrocellular material.

Various types of sheet perforating means have been developed which have proven satisfactory with hitherto known sheet materials. However, with the sheet products to which this invention relates, which are simultaneously tough, extremely pliable, and low density, the conventional sheet perforating means prove unsatisfactory since such means cause compressive distortion of the sheet surface such that the thickness of the sheet at and near each perforation is appreciably less than the thickness of unperforated portions. In addition, there is usually a residuum of cut material which may obstruct the perforations. The sheet surface may also to torn or ripped by the use of these known sheet perforating means and the processes for their employment.

Sometimes a needling process is used for perforating sheet materials. If the needles are small enough, the distortive forces noted above are not present. But when applied to the thick and resilient sheet materials to which this invention relates, needling normally produces perforations so small that they close or "heal" as soon as the needles are withdrawn. If needles of sufficiently large diameter to produce permanent perforations are employed, the same compressive distortion and tearing associated with cutting or die-punching results.

Another method for perforating sheet material involves high-voltage electrical discharge. Impracticably great voltages are required for thick sheet materials, and the process becomes difficult to control. Moreover, for a given material, the size of perforation produced increases with increasing thickness and remains relatively constant for a given thickness.

Heated protrusions are also used to perforate dense and/or rigid thermoplastic sheet materials by melting, substantial pressure on the sheet being simultaneously applied by the protrusion in order to assist in melting and in displacing the molten material. By this method the melted thermoplastic material is always left as an obvious part of the perforated structure. Often it occurs as a bead around the outer aperture of each perforation, the bead imparting heat-sealability to the sheet or sealing off a layer of the sheet structure. Sometimes the molten material is wiped along the walls of the perforation to seal cut elements and to prevent fraying or delamination.

In U.S. Patent 3,073,304, a perforation process for dense thermoplastic films is described wherein unheated protrusion elements exert compressive and punching forces on the film, these forces serving to press the film against a heated flat surface to assist in effecting perforation.

This invention provides a process for perforating thick sheets comprised of crystalline, oriented, thermoplastic, polymeric, supple, ultramicrocellular materials. It also provides ventilation of structures wholly or partly enclosed by these sheet materials, the ventilation resulting from perforations which are smooth-walled, uniform in shape and size, and free from residual melted material in the form of obstructions within the perforations or in the form of beads or other deposits around the edge of each perforation. A still further provision is a process for perforating these sheets without any deformation of the surfaces exclusive of the areas actually perforated. Other provisions will appear hereinafter.

These provisions result from the following invention which is a process for providing a perforated ultra-microcellular sheet which comprises heating at least one protrusion element to a temperature at least as great as the crystalline melting temperature of said ultramicrocellular sheet, inserting said heated protrusion element with only light pressure in a direction substantially perpendicular to the plane of said ultramicrocellular sheet, and then withdrawing said heated protrusion element without further contact with said ultramicrocellular sheet, the light pressure exerted by said heated protrusion element on said ultramicrocellular sheet being insufficient to permanently distort said ultramicrocellular sheet except in the area actually perforated, the motion of said heated protrusion element being approximately simple harmonic motion along the direction of insertion and withdrawal, the total residence time for any portion of said heated protrusion element within said ultramicrocellular sheet being at least as great as computed for the equation:

$$lnt = \alpha + \beta ln D_0 + \gamma ln(T/100) + ln(\rho h)$$

wherein $t$ is total residence time in seconds, $\beta$ is 1.35, $D_0$ is the diameter in inches of a circle having an area equal to the cross-sectional area of said heated protrusion element, $T$ is the temperature in degrees Centigrade of said heated protrusion element, $\rho$ is the density in pounds per cubic foot of said ultramicrocellular sheet, $h$ is thickness in inches of said ultramicrocellular sheet, $\alpha$ is equal to $-3.0476 + 0.06271(T_m)$, $\gamma$ is equal to $3.5478 - 0.04431(T_m)$, $T_m$ is the crystalline melting temperature in degrees Centigrade for said ultramicrocellular sheet and $ln$ is the symbol for the Naperian logarithm, whereby said ultramicrocellular sheet is provided with perforations which are uniform and smooth-walled, the melted polymer being uniformly deposited onto and into the newly formed walls of said perforations. Heat from each advancing protrusion element melts the cell walls in its path, collapses the cells, and causes the melting material to shrink away from the hot protrusion element and to be deposited onto the walls of the perforation being formed. Relative to the volume of melted material produced, the area of the walls of each perforation is so great that the melted polymer is not visible to the naked eye. The shrinkage results in perforations at least slightly larger than the protrusions causing them, and the protrusions therefore do not contact molten polymer while being withdrawn.

Figure 2:
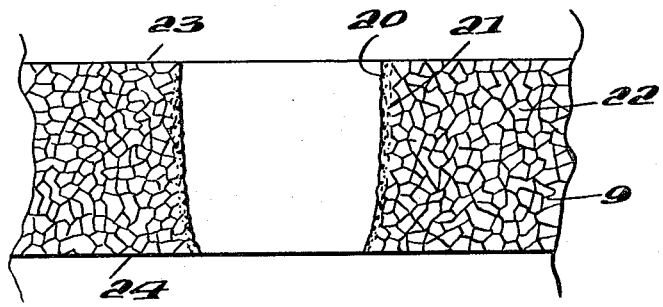

In order to better understand this invention, there are provided the following figures in which:

FIGURE 1 is a cross-sectional view of one form of apparatus by which this invention may be practiced; and FIGURE 2 is a cross-sectional view of a single perforation formed using a right-circular cylindrical protrusion.

Referring now to the figures, FIGURE 1 illustrates one type of perforating means by which the process of this invention may be practiced. An assembly 2 is provided with a means 1 for raising and lowering the assembly with respect to a sheet of the ultramicrocellular material 9. Protrusion elements 8, generally in a regularly spaced pattern, extend from the base plate 3 of assembly 2. Both base plate 3 and the protrusions 8 are composed of material having high thermal conductivity such that when a heating means 6 is disposed either onto or into the base plate 3 the temperature of the protrusion elements 8 may be raised above the crystalline melting point of the ultramicrocellular material. With a sheet 9 of the ultramicrocellular material held against a rigid table 11, the assembly 2 is moved so that the protrusions 8 go into and through the ultramicrocellular material to produce the perforations. It is preferable that a layer 10 of hard, but elastic, heat-resistant material be interposed between the rigid table 11 and the sheet 9 of ultramicrocellular material so that, when the protrusion elements 8 reach the surface of layer 10, application of pressure will cause the protrusions 8 to extend beyond the farthest surface 24 of the sheet 9. In this way any irregularities in the length or in the angle of insertion of the protrusion elements 8 will fail to cause perforations which do not completely pass through the ultramicrocellular material.

In a preferred embodiment of this invention, each protrusion element 8 is in the form of a peg of generally right-circular cylindrical shape. FIGURE 2 is a cross-sectional view of a perforation produced by a single peg such that surface 23 is the one entered by the peg and surface 24 represents the bottom of the sheet. The shape of the perforation produced, when viewed along the direction of insertion of the protrusions, is generally the same as the cross-sectional shape of each protrusion element 8. Since, in this case, the protrusion elements 8 are pegs of circular cross sections, the perforations also have circular cross-sections. Because the diameter of the perforation is a function of the time to which it has been exposed to a temperature above the melting point of the crystalline material and because each protrusion element 8 is heated to at least that temperature along its whole length, it is obvious that a perforation having the shape shown in FIGURE 2 results when assembly 2 of FIGURE 1 is used to form the perforations.

As the heated protrusion elements 8 advance into the ultramicrocellular material, the material immediately adjacent to the heated surfaces melts. As the melting occurs, the cellular structure of the material collapses, the high degree of uniplanar orientation is lost, and the molten polymeric material therefore recedes from the heated surfaces and accumulates on the walls of the perforations as they are formed.

FIGURE 2 shows not only what the shape of the perforation is but also how the molten polymer is disposed. In greatly exaggerated detail the layer 20 represents the polymer which has melted. Between the layer of melted polymer and the unaffected cells of the ultramicrocellular material is a layer 21 of partially collapsed and/or ruptured cells. Because this layer 21 exposes an area greater than was originally present, the molten polymer flows not only onto but also into the wall. Although this detail of the wall structure is clearly visible in microscopic examination, it is not readily visible to the ordinary unaided eye. Within the range of diameters of the protrusion elements 8 as hereinafter described, the process causes the apparent disappearance of the polymer which originally occupies each perforated volume of the sheet 9.

With reference again to FIGURE 1, the sheet materials 9 are generally of a density between 0.5 and 0.005 g./cc. and of uniform thicknesses varying between about 0.25 centimeter and 2.5 centimeters. This range of thicknesses is not to be considered a restriction on the invention because the process works equally well for both thinner and thicker sheets. For whatever thickness of sheet material perforation is intended, the protrusion elements 8 should be at least about 0.635 centimeter longer in exposed length than the thickness of the ultramicrocellular sheet 9. In addition, in order to avoid any melting of the unperforated area of the sheet, it is advisable to cover the base 3 of the assembly 2 with a layer of heat-insulating material 7 on its surface exclusive of the areas occupied by the protrusion elements 8.

The cross-sectional diameter of each right-circular cylindrical protrusion element 8 may vary from about .15 centimeter to about 1 centimeter. If protrusion elements 8 much greater than one centimeter in diameter, or in maximum transverse dimension, are used in this process, the melted polymer no longer recedes to the extent that it becomes completely deposited on the walls of the perforation being formed. Generally the protrusion elements 8 are greater in length than they are in diameter though this restriction does not necessarily apply since the minimum length of each protrusion element 8 is determined as stated hereinbefore by the thickness of the material to be perforated.

Because the ultramicrocellular material itself is a good heat insulator, the time required for passing a heated protrusion element 8 through it, at a given temperature of the protrusion 8, is much greater than that required for perforating dense polymeric films. The time required is also increased in that, if temperatures and pressures characteristic of dense film perforation are used, the polymer originally occupying the perforated space is first compacted and then melted so that an obvious bead of melted polymer remains around the lower edge of each perforation. At still shorter perforation times, a plug of unmelted polymer may remain at the lower edge of each perforation. Moreover, at these short perforation times, there is always distortion of the sheet surface adjacent to each perforation and there can also be tearing of the sheet surface.

The minimum time, $t_{min.}$, required for perforating these ultramicrocellular sheets which avoids the problems just mentioned is a function of the sheet thickness, $h$, the sheet density, $\rho$, the diameter $D_o$ of the protrusion element 8, the temperature, $T$, of the protrusion element 8, and the crystalline melting temperature, $T_M$, of the polymeric material. Equation 1 represents this functional relationship among the variables and is the result of regression analysis on the data obtained from a large number of perforation experiments. It predicts the minimum perforation time in seconds within a factor of two over the range of times between about 0.001 and 100 seconds. This minimum time, $t_{min.}$, is the total time the tip of a protrusion 8 is within the ultramicrocellular sheet, including withdrawal of the protrusion element 8, and it is based on a simple harmonic motion of the protrusion element 8 with respect to the direction normal to the surface of a sheet 9 being perforated.

$$\ln t_{min.} = \ln \rho + \ln h + \alpha + \beta \ln D_o + \gamma \ln (T/100) \quad (1)$$

in which:

$$\alpha = -3.0476 + 0.06271 (T_M) \quad (2)$$

$$\beta = 1.35 \quad (3)$$

$$\gamma = 3.5478 - 0.04451 (T_M) \quad (4)$$

ln is the symbol for the Naperian logarithm;
$T$ and $T_M$ are in degrees Centigrade;
$\rho$ is density in lb./ft.$^3$;
$h$ is thickness in inches; and
$D_o$ is the diameter in inches of a circle having an area equal to the cross-sectional area of said heated protrusion element, which in the preferred embodiment of a cylindrical protrusion element is the diameter in inches of a right circular cross-section. When the protrusion element, has a uniformly square cross-section throughout, the area of the square is then used to compute $D_o$ according to the formula: $A = \pi D_o^2/4$ If it is desirable to use metric units for $\rho$, $h$, and $D_o$, it is necessary to compute $\alpha$ from Equation 2a rather than from 2:

$$\alpha = -1.1041 + 0.06271\ (T_M) \tag{2a}$$

for $h$ and $D_o$ in centimeters and $\rho$ in gm./cm.$^3$

The temperature, T, of each protrusion element 8 must always be greater than the crystalline melting point, $T_M$, of the polymeric material. As T approaches $T_M$ the time required to form a perforation, or to simultaneously form a number of perforations, increases markedly. A commercially desirable process requires a minimum perforation time of one second, or preferably much less. The minimum temperature of each protrusion element 8 is, therefore, at least about 100° C. greater than $T_M$. The maximum temperature of each protrusion element 8 depends on the structural strength of the material from which it is constructed, and this temperature should not normally exceed about 600° C. at which temperature most metals exhibit a glowing red color. Even at this temperature, perforating a 0.25 in. (0.635 cm.) thick ultramicrocellular sheet with a 0.25 in. (0.635 cm.) diameter protrusion element 8 when the bulk density is about 1 lb./ft.$^3$ (0.016 gm./cm.$^3$) requires about 0.1 second. Even the thinnest ultramicrocellular sheets being perforated at 600° C. with a protrusion element 8 only 0.0625 in. (0.1588 cm.) in diameter require perforation times of about 0.001 second. By comparison with perforation times for dense, thermoplastic films, it is seen that longer perforation times are required for these ultramicrocellular sheet products.

To achieve these minimum perforation times, it is necessary that the heated protrusion elements not only contact the ultramicrocellular material but also exert a slight pressure capable of collapsing the cells in contact with the protrusion element and thereby increasing the rate of heat transfer. At lower perforation temperatures, melted polymer (and adhesive, if laminates are being perforated) may stick to the protrusion element and later carbonize or deposit undesired residues. It is usually necessary, then, at temperatures below about 300° C., to coat each protrusion element with a thin layer of polytetrafluoroethylene or other equivalent release agent as is familiar to one skilled in the art. Above about 300° C., however, no precaution need to taken to prevent sticking of polymer and adhesive to the protrusion elements and bare metallic protrusion elements are not only satisfactory, but are preferred.

The shape of perforation illustrated by FIGURE 2 is that produced when the perforation time is the minimum as calculated using Equation 1. On continued exposure to heat from the inserted protrusion element, the ultramicrocellular material continues to melt, and, since the material at entrance surface 23 has the longest exposure, the diameter of the perforation is greatest at that point. At the lower surface 24, however, the exposure to heat is only momentary, and the perforation diameter at that point is only slightly greater than the diameter of the protrusion element employed. As the protrusion element is withdrawn so that its tip moves from surface 24 back to surface 23, and away from the sheet 9, no contact is made between it and the ultramicrocellular material, but melting continues nevertheless.

The larger each perforation becomes, the more slowly it grows until a maximum diameter is reached. Even if a heated protrusion element is left inserted within an ultramicrocellular sheet 9 for as much as two minutes, the diameter of the perforation will not exceed a given value, $D_M$, associated with a maximum effective perforation time, $t_M$. Equation 5 is an excellent predictor of the relationship between the perforation diameter, $D_o$ produced when a perforation time, $t$, in excess of $t_{min}$ is employed.

$$\frac{(D-D_o)^2}{(D_M-D_o)^2} + \frac{(t-t_M)^2}{t_M^2} = 1 \tag{5}$$

in which:

$D_o$ is the diameter of the protrusion element;

$$t_M = 19.1 + 6910\frac{\rho h}{\Delta t} \tag{6}$$

$$D_M \cong D_o(1 + 0.00587\Delta T) \tag{7}$$

$\rho$ is bulk density of sheet 9 in lb./ft.$^3$;
$h$ is thickness of sheet 9 in inches; and
$\Delta T$ is $(T - T_M)$ as hereinbefore defined.

Equations 5, 6, and 7 permit the previous computation of perforation size and shape. Perforations with tapered walls always result from minimum times of perforation from Equation 1, but the closer the perforation time comes to $t_M$, the more perfectly uniform is the perforation diameter throughout. To avoid tapering of the walls, then, an obvious method is to insert the heated protrusion element, leave it within the sheet 9 for a short period and then withdraw it. Another technique which avoids tapering of the walls of each perforation is to use protrusion elements with only the tips heated, the hot portion being appreciably thinner than the thickness of the ultramicrocellular sheet. In this way the melting is made incremental throughout the sheet 9, and times of exposure to heat at the various levels of the sheet 9 are nearly equalized.

At minimum perforation times, the growth, G, of the perforation at the entrance surface 23 is from about 1 to 50% where $$\frac{G}{100} = \frac{D-D_o}{D_o} \tag{8}$$

At maximum perforation times this growth can be 300% or even more, depending on $D_o$ and $\Delta T$ as shown in Equation 7.

The following examples are given to illustrate the invention, but are not in any way intended to limit the scope of this invention.

EXAMPLE I

An ultramicrocellular sheet material is prepared by extrusion as follows. In a 2.0 inch (5.08 cm.) diameter heated extruder-mixer, 50 parts by weight of stereoregular polypropylene (melt flow 4.0 at 230° C.) containing 1% by weight of finely divided silica aerogel is first melted and then mixed with 37 parts by weight of methylene chloride and 13 parts by weight of 1,2-dichloro-1,1,2,2-tetrafluoroethane. The resulting homogeneous foamable composition at 140° C. and 300 p.s.i.g. (21.1 kg./cm.$^2$ gauge) is extruded into the atmosphere through a die having a circular annular orifice 1.5 in. (3.81 cm.) in diameter, 0.007 in. (0.0178 cm.) in gap width, and 0.100 in. (0.254 cm.) in land length. The extruded tubular product forms at about 390 ft./min. (117 m./min.) and passes nip rolls located about 5 ft. (1.5 meter) below the extrusion orifice and adjusted to pass the product at the extrusion rate. In this way some of the gases which flash off are trapped within the extruded tube to generate a pressure which stretches the tube and flattens the corrugations unavoidably formed adjacent to the face of the extrusion die. The ultramicrocellular product has polyhedral cells with maximum transverse dimensions in the range of 100 to 400 microns, a sheet thickness varying between about 0.030 and 0.050 in. (0.076 and 0.127 cm.), and an average density of approximately 1.25 lb./ft.$^3$ (0.02 gm./cm.$^3$).

The tubular product is slit longitudinally and opened into a continuous flat sheet about 2 ft. (0.6 meter) wide, and then the continuous sheet is cut into pieces either 7.5 ft. (2.25 meters) or 5.5 ft. (1.65 meters) long. With these pieces, an eight-layer laminate is constructed using "Upaco" E633, a pressure sensitive adhesive sold by the Union Paste Company, which is diluted with chloroform to 2% solids by weight. The machine direction of the pieces in each layer is positioned at right angles to the machine directions of the pieces in adjacent layers. The resulting laminated structure is approximately 7.5 ft.

(2.25 meters) long x 5.5 ft. (1.65 meters) wide x 0.33 in. (0.84 cm.) thick, weighs about 580 gm., and has nearly identical tensile properties in the length and width directions. It is compressed to a stable, uniform thickness of 0.1875 in. (0.4762 cm.) and simultaneously embossed by placing it in a flat press at 70° C. and under 70 p.s.i. (4.93 kg./cm.$^2$) pressure for 5 minutes between two 8-mesh wire screens. The thickness is regulated by two 0.1875 in. (0.4762 cm.) thick gauge blocks, one at each end of the platens of the press.

The embossed laminate is then perforated using an apparatus essentially as shown in FIGURE 1. A home laundry iron is modified by fastening a 0.25 in. (0.0636 cm.) thick brass plate to its sole plate, the two comprising the base plate 3. To the brass plate are fastened, in square array having centers separated by 1.0 in. (2.54 cm.), brass pegs which are 0.125 in. (0.318 cm.) in diameter and 1.0 in. (2.54 cm.) long. A 0.25 in. (0.636 cm.) thick insulating board is fixed over the exposed surface of the base plate so as to concentrate the heat from the laundry iron into the pegs. The temperature of the pegs is estimated to be between 300 and 350° C. with an input voltage of 40 volts to the heating element of the laundry iron. A soft backing layer is placed under the embossed laminate and the iron is lowered so that the pegs perforate the laminate, a perforation time of about 1 second being estimated. The perforations produced are tapered from about 0.1875 in (0.477 cm.) diameter at the top to about 0.125 in. (0.318 cm.) diameter at the bottom. By repeating this operation, the whole surface of the pad is perforated. Trimmed to 80 in. (2.03 meters) x 57 in. (1.45 meters), the perforated pad has an average density of about 2.0 lb./ft.$^3$ (0.03 gm./cm.$^3$) and is used as a spring insulator in constructing a mattress.

EXAMPLE II

A soldering iron, such as customarily is used in electronic wiring work, is rigidly mounted in the vertical position on a brace so that its heated end is downward. The brace is slidably mounted on two parallel vertical rods and has within it a horizontal slot which accommodates the connecting rod from the drive means. For the drive means, a motor driven by air pressure is provided on its axle with a disc, perpendicularly to which the aforementioned connecting rod is rigidly mounted at a distance of one in. (2.54 cm.) from the center of rotation of the axle. With the connecting rod inserted into the horizontal slot of the brace, a simple harmonic vertical motion is imparted to the soldering iron when the axle of the air-motor rotates at constant angular velocity. Special right-circular cylindrical pegs are provided for the soldering iron to replace the customary peg which, in soldering applications, actually contact the point where the soldered connection is to be made. Each of these special pegs is made from brass and coated with a thin layer of polytetrafluoroethylene, each is long enough that it extends at least 1.0 in. (2.54 cm.) beyond the end of the remainder of the soldering iron when clamped in place therein, and each has silver-soldered within its tip an iron-constantan thermocouple. At operating temperatures above about 300° C., the polytetrafluoroethylene slowly decomposes and bares areas of the special brass peg surfaces are revealed. Loss of the polytetrafluoroethylene coating at these temperatures is of no consequence since peg performance with regard to sticking of melted polymer and adhesive is unimpaired.

In operation, the soldering iron is heated electrically. The voltage generated by the thermocouple in the special peg being used is the signal by which a standard control circuit indicates and regulates the temperature of the peg. The ultramicrocellular sheet, held against a rigid flat board of insulating material, is perforated when placed under the oscillating soldering iron so that the heated peg moves normal to the sheet surface and reaches just to the surface of the rigid flat board at its greatest downward displacement. Constant rotational velocity of the axle of the air-motor is read using a standard tachometer, and this angular velocity, coupled with the thickness of the sheet, is used to compute the time the peg, or any part of it, is at or below the upper surface of the ultramicrocellular sheet. For a given ultramicrocellular sheet and a given peg temperature, there is a minimum perforation time which will produce a perforation free of residual polymer without permanent distortion of the sheet surrounding each perforation. Examples of measured minimum perforation times are shown in the following table over a range of the variables involved.

In the table, $D_0$ is the diameter of the right-circular cylindrical peg used, $h$ is the thickness of the ultramicrocellular sheet, temperature is that of the heated peg, and $t_{min.}$ is the measured minimum perforation time. The sheet codes have the following significance. The single digit immediately preceding the letter identifies the number of plies of single ultramicrocellular sheets adhesively laminated to form the sheet being perforated. A double digit code serves to differentiate two sheets with equal numbers of plies. The letters identify the type of polymer of which each ultramicrocellular sheet is comprised:

E denotes linear (high density) polyethylene $$(T_M \sim 130° C.)$$

P denotes stereo-regular polypropylene ($T_M \sim 165°$ C.); and

T denotes polyethyleneterephthalate ($T_M \sim 265°$ C.).

TABLE I.—MINIMUM PERFORATION TIMES

| Sheet Code | $D_v$ | | $h$ | | Bulk Density | | Temperature (° C.) | T. min. (sec.) |
| --- | --- | --- | --- | --- | --- | --- | --- | --- |
| | (inches) | (cm.) | (in.) | (cm.) | (lb./ft.$^3$) | (gm./cm.$^3$) | | |
| 1E | .241 | .612 | .46 | 1.17 | 1.4 | .022 | 350 | 0.7 |
| 2E | .241 | .612 | .33 | .84 | 1.4 | .022 | 290 | 1.0 |
| 3E | .241 | .612 | .29 | .74 | 1.4 | .022 | 520 | 0.2 |
| 2E | .374 | .950 | .33 | .84 | 1.4 | .022 | 538 | 0.4 |
| 3E | .374 | .950 | .29 | .74 | 1.4 | .022 | 400 | 0.9 |
| 4E | .374 | .950 | .47 | 1.19 | 1.4 | .022 | 538 | 0.6 |
| 1P | .124 | .315 | .035 | .089 | 0.9 | .014 | 300 | 0.045 |
| 6P | .124 | .315 | .28 | .71 | 1.1 | .018 | 485 | 0.10 |
| 16P | .124 | .315 | .31 | .79 | 5.1 | .082 | 300 | 1.0 |
| 4P | .241 | .612 | .19 | .48 | 1.4 | .022 | 300 | 1.0 |
| 6P | .241 | .612 | .28 | .71 | 1.1 | .018 | 450 | 0.3 |
| 9P | .241 | .612 | .31 | .79 | 1.1 | .018 | 400 | 0.6 |
| 12P | .241 | .612 | .25 | .64 | 3.6 | .058 | 450 | 1.7 |
| 2P | .374 | .950 | .09 | .23 | 1.4 | .022 | 500 | 0.09 |
| 6P | .374 | .950 | .28 | .71 | 1.1 | .018 | 500 | 0.3 |
| 9P | .374 | .950 | .31 | .79 | 1.1 | .018 | 350 | 1.7 |
| 12P | .374 | .950 | .25 | .64 | 3.6 | .058 | 500 | 1.7 |
| 1T | .241 | .612 | .035 | .089 | 0.9 | .014 | 515 | 0.01 |
| 2T | .241 | .612 | .09 | .23 | 1.3 | .021 | 515 | 0.02 |
| 4T | .241 | .612 | .19 | .48 | 1.4 | .022 | 350 | 0.8 |

From the table it is obvious that temperatures generally 100° C. or greater than the crystalline melting temperature, $T_M$, of the polymeric material are required to perforate ultramicrocellular sheets in commercially desirable times of 1 second or less.

EXAMPLE III

Using the apparatus of Example II, growth of the diameter of perforations on continued exposure to a heated peg is determined. The ultramicrocellular sheet coded 6P in Example I is perforated using a peg maintained at 450° C. Each time reported is the total time the peg is held in the ultramicrocellular sheet against the rigid backing board. The peg diameter is 0.241 in. (0.612 cm.). The diameter recorded is that at the entry surface 23. At 0.6 sec., the perforation has the shape indicated by FIGURE 2, but at all greater times the perforation diameter is substantially constant throughout the sheet thickness.

TABLE II.—PERFORATION GROWTH

| Time (sec.) | Diameter (inches) | Diameter (cm.) | Percent Growth |
|---|---|---|---|
| 0.6 | .33 | .84 | 37 |
| 1.2 | .36 | .91 | 49 |
| 2.2 | .40 | 1.02 | 67 |
| 2.9 | .42 | 1.07 | 76 |
| 4.0 | .44 | 1.12 | 82 |
| 9.5 | .54 | 1.37 | 126 |
| ∞ | .70 | 1.78 | 190 |

The time designated by the infinity symbol is at least 30 sec. and the diameter of 0.7 in. (1.78 cm.) is the maximum which can be obtained for this sheet under these conditions. Column four of Table II is the percentage increase of the measured diameter over the diameter of the peg used.

The crystalline, oriented, thermoplastic, polymeric, supple, ultramicrocellular materials which are particularly adaptable to this invention are described in Belgian Patent No. 625,829 and will hereinafter be referred to as ultramicrocellular materials. They are unique owing to the polyhedral shape of their cells, to the film-like character of the cell walls, and to the uniform texture and high degree of crystalite orientation, i.e., uniplanar orientation, existing in these walls. Together these features serve to define a class of materials which, in comparison with cellular structures of prior art, exhibit outstanding strength and resiliency properties although fabricated at extremely low densities. From the standpoint of still other desirable characteristics, the ultramicrocellular structures are supple, opaque, and pneumatic, and they have exceedingly high bulk and low thermal conductivity. They may be produced in sheet form and as such are well adapted to a variety of end uses.

Substantially all of the polymer present in these ultramicrocellular materials is present as filmy elements whose thickness is less than 2 microns, and preferably less than 0.5 micron. The thickness of a cell wall, bounded by intersections with other walls, does not ordinarily vary by more than ±30%. Adjacent walls usually will have generally equal thickness values, such as within a factor of 3. The polymer in the cellular walls exhibit uniform texture and uniplanar orientation. The apparent density of the ultramicrocellular materials is between 0.5 and 0.005 g./cc. The number of cells per cc. is desirably at least $10^3$, although values of $10^5$ or greater are preferred.

The term "uniform texture" signifies that the density, thickness, and molecular orientation of the polymer in a cell wall are substantially uniform over the whole area of the wall when examined at a resolution of about ½ micron. The presence of uniform texture is best ascertained with a combination of two optical tests performed on single cell walls removed from the sample and mounted normal to the optic axis. Thickness and density are measured with an interference microscope in known manner from the displacement of interference fringes. "Substantially uniform" in this test means that the thickness and density do not vary by more than about ±30% across the area of the cell wall. The uniformity of molecular orientation is observed with a polarizing microscope under conditions customarily employed for detecting optical birefringence. For this test, "substantially uniform" means that complete extinction must occur over the whole area of the cell wall. For ultramicrocellular cell walls having an over-all preferred direction of molecular orientation (in addition to the required uniplanar orientation), rotation of the wall in its own plane may be necessary to obtain complete extinction. For ultramicrocellular walls having random molecular orientation, complete extinction will be observed at every position of the sample. In contrast, if a cell wall has numerous patches of directional molecular orientation, and if the directional component of each patch is not oriented exactly parallel to all of the others, it does not possess uniform orientation, cannot cause complete extinction simultaneously over its whole area, and is not ultramicrocellular. Furthermore, any cell walls with lacy or cobweb-like appearance do not, of course, have uniform thickness or orientation over their whole areas, and are readily distinguished from ultramicrocellular material.

The cell wall thickness and other cell dimensions can be determined by microscopic examination of cross sections. The cells are found to exhibit a generally polyhedral shape, similar to the shape of internal bubbles in a foam of soap suds. Transverse dimensions of the cells are less than 1000 microns, preferably less than 300 microns, and the mutually perpendicular transverse dimensions of a single cell as produced do not vary by more than a factor of 3.

Examples of synthetic organic polymers suitable for producing the ultramicrocellular sheets for which this invention provides a means of perforation include the class of synthetic, crystallizable, organic polymers; e.g., polyhydrocarbons such as linear polyethylene, stereoregular polypropylene or polystyrene; polyethers such as polyformaldehyde; vinyl polymers such as polyvinylidene fluoride; polyamides both aliphatic and aromatic, such as polyhexamethylene adipamide and the polyamide from 2,2-bis-p-aminophenyl propane and isophthalic acid; polyurethanes, both aliphatic and aromatic, such as the polymer from ethylene bischloroformate and ethylene diamine; polyesters such as polyhydroxypivalic acid and polyethylene terephthalate; copolymers such as polyethylene terephthalate-isophthalate, and equivalents. The polymers should have a softening point of at least about 40° C. as determined by passing a stick of solid polymer in sliding contact with a heated metal bar and observing the bar temperature at which a streak of molten polymer is just formed. The polymers should also be of at least film-forming molecular weight. Polymer properties such as solubility, melting point, etc. are usually reflected in the properties of the ultramicrocellular product.

One of the features of the ultramicrocellular structures is a high degree of orientation of the polymer in the cell walls, which contributes to the unique strength of these structures. Therefore, a preferred class of polymers includes those materials which respond to an orienting operation (e.g., drawing of fibers or films) by becoming substantially tougher and stronger. This class of polymers is well known to one skilled in the art and includes, for example, linear polyethylene, polypropylene, 66 nylon, and polyethylene terephthalate.

The sheet product to be perforated need not necessarily be a single thickness of extruded ultramicrocellular material. It can, for example, be a laminate of two or more layers of ultramicrocellular sheets adhesively bonded. Moreover, the ultramicrocellular sheet may be bulked in some fashion so that its effective density is less than the density of the ultramicrocellular material of which it is comprised. Again, it is within the scope of this invention to include in a laminated structure, either on its outer surfaces or between layers of ultramicrocellular sheets, a thin film of dense, thermoplastic, polymeric material. Representative thin films are those composed of polyethylene terephthalate, polypropylene, or polyethylene. When these thin films are incorporated into an ultramicrocellular sheet and the laminated structure is perforated according to this invention, the perforation rate, governed by the ultramicrocellular components, is low enough that the thin films affect perforation time only through a minor increase in sheet thickness.

FIGURE 1 is drawn with an electrical heater 6 such as would be found in a household iron, but any method whatever of heating the protrusion elements to the required temperature is included within the scope of this invention. Alternatively, for example, the electrical heater can be replaced by hot oil circulated within the protrusion assembly 2. It is not necessary, however, that the heating means 6 be in or on the baseplate 3 to which the protrusion elements are fastened. Heating means external to the protrusion assembly 2 are also effective, such as, for example, a heated surface which contacts the ends of the protrusion elements between perforation cycles. The protrusion elements can also be heated externally with radiant heaters. Other heating variations will be obvious to those skilled in the art.

For aesthetic reasons it is sometimes preferable to use protrusion elements not all of which have the same cross-sectional shape or area and which are not necessarily equally spaced from one another. However, it is preferable that each protrusion element have an essentially constant cross-sectional area. Thus, patterns of perforation by spacing, by size, and by shape may be created by this process, the value of which is obvious to one skilled in the art. Although the perforation process is capable of producing perforations spaced in any way from one another, a serious loss in properties of the ultramicrocellular sheet results if too great a fraction of the total sheet area is perforated or if several perforations are too closely spaced. It is preferred, therefore, that not more than 20% of the surface area be perforated and that the centers of any pair of adjacent perforations be no closer than the sum of their diameter values. In the foregoing description, only perforations extending completely through the ultramicrocellular sheet have been considered, but this is not intended to be a limitation of the invention. Indeed, perforations can be made only part of the way through a sheet by limiting the motion of the heated protrusions 8. When partial perforations are required, calculation of minimum perforation time can be computed as hereinbefore described by replacing the total sheet thickness in Equation 1 with the actual depth of penetration of the protrusion 8. It is obvious that perforations can be made simultaneously into both faces of the ultramicrocellular sheets and that partial perforations so made can be staggered or can be made to meet within the sheet thus alternately producing total perforations.

The process of this invention can be either batch, step-wise or continuous. As a batch or step-wise operation, it may be practiced using a simple apparatus such as is shown in FIGURE 1; and, when rigid control of perforation size is not required, said apparatus can be hand-held and hand-operated. One means for a continuous operation comprises a large heated cylinder from the surface of which the protrusions 8 extend so that they perforate the ultramicrocellular material as the material is transported into contact with the protrusions 8 by another cylinder of similar diameter, both cylinders rotating at the same rate but in opposite rotary directions. If elongated, slot-like perforations are desired, they can easily be made by purposely creating a slight mismatch in the rotary speeds of the two large cylinders. Still further means of implementing this invention will be obvious to those skilled in the art.

The uses for ultramicrocellular sheet materials are numerous; when they are perforated according to this invention, the range of uses is even further extended. The perforations provide ventilation for the ultramicrocellular sheet which otherwise would be impermeable to air, and, therefore, the perforated ultramicrocellular sheet is particularly useful as a spring insulator pad in mattresses and upholstered furniture. For these products, the perforations not only provide the necessary ventilation but also prevent the phenomenon known as "drumming" which results when an article of furniture having a relatively impermeable spring insulator pad is struck. Another use is in the construction of automobile upholstery and headliners. The perforated ultramicrocellular sheet is also excellent as cushioning, such as rug underlayment and packing for delicate items.

This process for the perforation of ultramicrocellular sheets is unique in that smooth-walled, absolutely void, uniform perforations are made without the simultaneous application of pressure which deforms the unperforated portions of the low density and very pliable material. It is further unique in that the polymeric material which is melted seems to disappear and can be found only by careful microscopic examination. No bead, band, smear, or any other accumulation of melted polymer remains visible.

As many widely different embodiments of this invention may be made without departing from the spirit and scope thereof, it is to be understood that this invention is not limited to the specific embodiments thereof except as defined in the appended claims.

I claim:

1. A process for providing a perforated ultramicrocellular sheet which comprises inserting at least one protrusion element heated to a temperature at least about 100° C. greater than the crystalline melting temperature of said ultramicrocellular sheet, but not greater than about 600° C., in a direction substantially perpendicular to the plane of said ultramicrocellular sheet, with a light pressure capable of collapsing the cells in contact with the protrusion element but being insufficient to permanently distort said ultramicrocellular sheet except in the area actually perforated, and then withdrawing said heated protrusion element without further contact with said ultramicrocellular sheet, the motion of said heated protrusion element being approximately simple harmonic motion along the direction of insertion and withdrawal, and the total residence time for any portion of said heated protrusion element within said ultramicrocellular sheet being at least from about 0.001 second to about 1 second, whereby said ultramicrocellular sheet is provided with perforations which are uniform and smoothwalled, the melted polymer being uniformly deposited onto and into the newly formed walls of said perforations.

2. The process of claim 1 wherein the protrusion element has the shape of a right-circular cylinder of uniform cross-section, said cross-section being a circle having a diameter from about 0.15 cm. to about 1 cm.

3. The process of claim 1 wherein the protrusion element is coated with polytetrafluoroethylene.

4. The process of claim 1 wherein the protrusion elements are longer than the thickness of said ultramicrocellular sheet.

5. The process of claim 1 wherein the ultramicrocellular sheet is comprised of linear polyethylene.

6. The process of claim 1 wherein the ultramicrocellular sheet is comprised of stereo-regular polypropylene.

7. The process of claim 1 wherein the protrusion element is inserted in said ultramicrocellular sheet such that not more than 20% of the surface area of said ultramicrocellular sheet is being contacted by said protrusion element, and wherein said protrusion element is inserted not closer to any adjacent insertion than the diameter of said protrusion element.

8. The process of claim 1 wherein said ultramicrocellular sheet is a laminated structure having disposed over at least one of the laminal surfaces thereof, a thin film of dense, thermoplastic polymeric material.

9. The process of claim 1 wherein the ultramicrocellular sheet is comprised of poly(ethyleneterephthalate).

References Cited

UNITED STATES PATENTS

| 1,862,633 | 6/1932 | Ramsay. | |
| 2,597,726 | 5/1952 | Hall. | |
| 2,722,719 | 11/1955 | Altstadter | 264—321 X |
| 3,073,304 | 1/1963 | Schaar. | |
| 3,123,656 | 3/1964 | Rochlin | 264—321 |
| 3,187,380 | 6/1965 | Harrison. | |
| 3,227,784 | 1/1966 | Blades et al. | 264—53 |
| 3,301,935 | 1/1967 | Stoeckhert | 264—321 |

FOREIGN PATENTS 890,506  2/1962  Great Britain.

ALEXANDER H. BRODMERKEL, *Primary Examiner.*

P. E. ANDERSON, *Assistant Examiner.*